Jan. 9, 1968  C. F. HEESCH  3,362,237
HERMETICALLY SEALED MECHANICAL ASSEMBLY
Filed July 22, 1964

INVENTOR
CRAIG F. HEESCH
BY Samuel Lindenberg
Arthur Freilich
ATTORNEYS

United States Patent Office 3,362,237
Patented Jan. 9, 1968

3,362,237
HERMETICALLY SEALED MECHANICAL
ASSEMBLY
Craig F. Heesch, Los Angeles, Calif., assignor to Mechanized Science Seals, Incorporated, Los Angeles, Calif., a corporation of California
Filed July 22, 1964, Ser. No. 384,499
8 Claims. (Cl. 74—89.15)

This invention relates generally to a mechanical assembly for converting rotational motion into longitudinal movement and more particularly to such an assembly which provides a hermetic seal.

Very many applications exist in products provided by our modern technology which require that a container be hermetically sealed. These applications include the production of space vehicles, navigational platforms, weapons systems, etc. It is often essential to provide some means in these sealed containers which permits external adjustment of a longitudinally movable member within the container. It is usually convenient to provide a screw head on the outside of the container which can be selectively rotated to affect the desired internal adjustment.

Many assembly designs for performing the aforedescribed function are known in the prior art, but each design has been unsatisfactory in certain respects. For example, because of the environment in which assemblies of this type are employed, it is essential that they be able to withstand extreme vibration. That is, the assembly must be designed to include positive means for preventing the externally adjustable screw from vibrating out of its threaded receptacle. As a consequence, one solution that has been suggested to prevent this occurrence is to weld a washer adjacent the head of the screw which washer would permit access to the screw head but would prevent the screw from vibrating out. Although such a solution solved the vibration problem, it created another problem inasmuch as it made it impossible to disassemble the assembly without damaging it.

Many examples of other problems could readily be cited but suffice it to say that these other problems have variously involved the longitudinal force that the assembly could withstand, the stability of the longitudinally movable member within the container, the amount of bearing surface area provided, and other problems of a similar nature. In addition, a paramount problem characteristic of all the known designs involves the high cost of assembling due to the relatively great number of parts which must be used.

In view of the foregoing, it is an object of the present invention to provide an improved hermetically sealing assembly capable of converting external rotational motion into internal longitudinal movement.

Briefly, the present invention is based upon the recognition that by using a differentially threaded member, i.e., a member having both a righthand threaded portion and a lefthand threaded portion, an assembly of the aforedescribed type can be provided in which the member is inherently prevented from vibrating out and yet which can be disassembled without being damaged.

In accordance with a preferred embodiment of the invention, a screw member is provided which has a slotted head portion externally threaded in a righthand direction and a reduced end portion externally threaded in a lefthand direction. The righthand screw thread is adapted to be screwed into an internally threaded receptacle in a plate member. The plate member is adapted to be hermetically sealed to a container. A sleeve defining an internally threaded receptacle is threaded on the lefthanded screw thread. The sleeve is fitted for longitudinal movement in a cylindrical wall defined by the plate member. When the screw member is rotated clockwise, the screw moves into the plate member as the sleeve unscrews on the screw lefthand thread. Thus, the sleeve is able to move twice the longitudinal distance moved by the screw member. First and second limit stops are provided to respectively halt the forward movement of the screw and the return movement of the sleeve. Thus, the assembly is prevented from vibrating apart. The hermetic seal is provided by an expansible bellows secured between the sleeve and the outside of the cylindrical wall.

As a consequence of providing an assembly of this type which inherently positively prevents a member from vibrating out without necessitating the provision of, for example, a welded washer for this purpose, several additional advantages are achieved. Thus, for an assembly of given external dimensions, a greater number of mating threads are provided thus significantly increasing the strength of the assembly in a longitudinal direction. Also, because the use of a differential thread enables the sleeve to move twice the distance moved by the screw member, the screw member can be made shorter thereby permitting the shaft or longitudinally movable member secured to the sleeve to be longer and thus anchored deeper in the sleeve. This considerably increases the shaft stability.

The novel features that are considered characteristic of this invention are set forth with particularly in the appended claims. The invention itself both as to its organization and method of operation, as well as additional objects and advantages thereof, will best be understood from the following description when read in connection with the accompanying drawings, in which:

Figure 1:
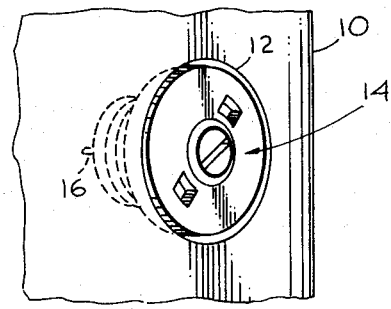
FIGURE 1 is a perspective view illustrating an assembly in accordance with the invention mounted in a container.
Figure 2:
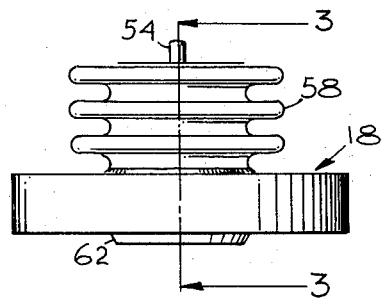
FIGURE 2 is an external side view of a preferred embodiment of the invention.

Attention is now called to FIGURE 1 of the drawings which illustrates a hermetically sealed container 10 having a seat 12 formed therein for receiving an assembly 14 in accordance with the invention. As noted, the function of the assembly 14 is to provide means by which a longitudinally movable member or shaft 16 within the container 10 can be adjusted from outside of the container.

Figure 3:
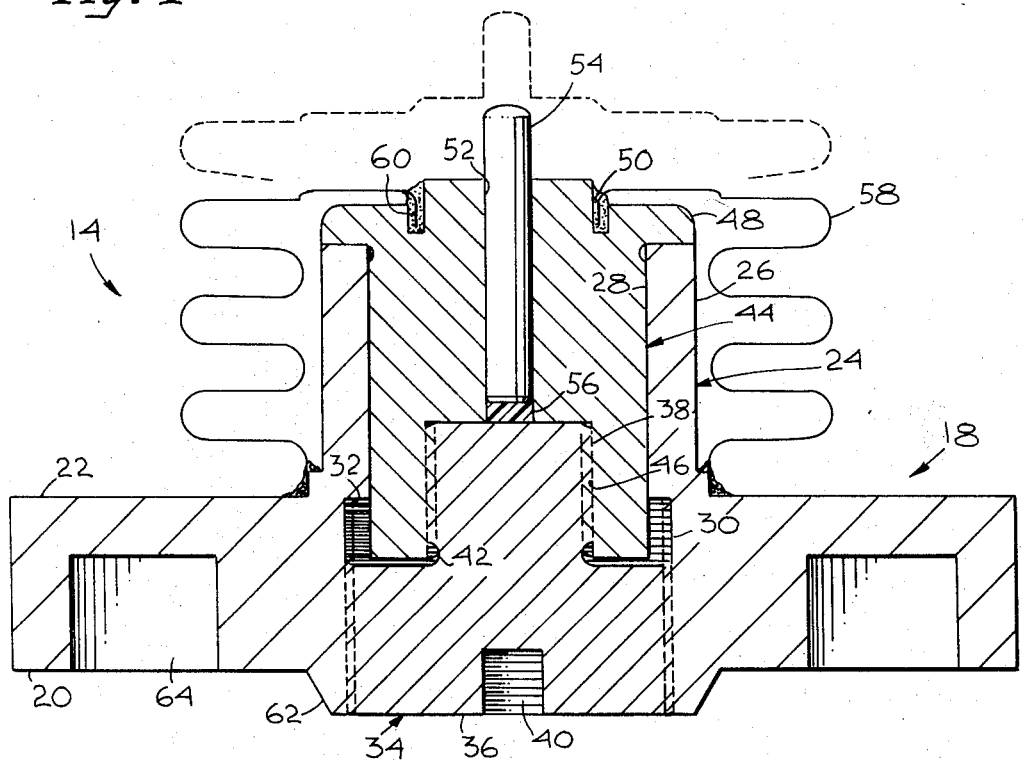
FIGURE 3 is a vertical sectional view taken substantially along the line 3—3 of FIGURE 2.

The assembly 14, as can be seen best in the sectional view of FIGURE 3, includes a plate or flange member 18. The member 18 includes a flange portion 20 adapted to be received within the seat 12 of container 10. The surface 22 of the flange portion 20 is hermetically sealed to the container 10 as by an epoxy resin deposited between the surface 22 and the container 10. Projecting perpendicularly from the flange portion 20, is a cylindrical wall 24 defining a central axial aperture therethrough. The wall 24 has an outer surface 26 and an inner surface 28. The central axial aperture defined by the wall 24 communicates and is coaxial with a cylindrical screw receptacle 30 defined in the flange portion 20. The receptacle 30 is internally threaded with a thread in a first direction which will arbitrarily be assumed to be a righthanded thread. The diameter of the cylindrical receptacle 30 is greater than the diameter of the axial aperture through the wall 24 and thus a shoulder 32 is defined between the internally threaded wall of the receptacle 30 and the inner surface 28 of the wall 24.

A screw member 34 is provided which includes an externally threaded head portion 36 and a reduced end portion 38. The head portion is slotted at 40 to receive a screwdriver. The head portion 36 is externally threaded with a righthanded thread adapted to mate with the internal threading in the receptacle 30. The end portion 38 is provided with a thread of similar pitch but oppositely directed, i.e., lefthanded, from the thread on the head portion 36. A relief 42 is preferably formed between the head and end portions 36 and 38 of the screw member 34 in order to facilitate the machining thereof.

A sleeve 44 is provided which defines an internally threaded receptacle 46. The inner wall of the receptacle 46 is provided with a lefthanded thread adapted to mate with the lefthanded external thread on the end portion 38 of the screw member 34. The sleeve 44 is provided with a terminal flange 48 adapted to engage the end of the cylindrical wall 24 as illustrated. A relief can be formed between the flange 48 and the body of the sleeve 44 to facilitate the fabrication of the sleeve.

The sleeve member 44 defines a circular slot 50 on the end thereof. In addition, a hole 52 extends from the end of the sleeve member 44 toward the receptacle 46. A shaft 54 is received in the hole 52 and is anchored by an epoxy or other suitable material 56.

An expansible bellows member 58 defining a central aperture therethrough is received around the outer surface 26 of the wall 24. Formed integral with and depending from the top of the bellows member 58 is a vertical flange 60 which extends into the circular slot 50. Solder material can be received in the circular slot 50 to secure the flange 60 to the sleeve 44. The opposite end of the bellows member 58 is joined by solder to the outer surface 26 of the wall 24.

In the operation of the assembly thus far described, when the screw member 34 is rotated in a clockwise direction by a screwdriver received in slot 40, the head portion 36 will threadedly move into the receptacle 30 toward the shoulder 32. Inasmuch as relative rotation between the sleeve 44 and cylindrical wall 24 is prevented by the bellows member 58, the sleeve member 44 will unscrew from the screw member end portion 38. Thus, for every unit length moved in a longitudinal direction by the screw member 34, the sleeve member 44 will move two unit lengths in a forward longitudinal direction thereby extending the bellows member 58. The screw member can be turned in a clockwise direction until the head 36 abuts the shoulder 32. When this occurs, the bellows member 58 is in the extended position shown in dotted lines in FIGURE 3. When the screw member is turned in a counterclockwise direction, the sleeve 44 is withdrawn to the solid line position until the flange 48 thereof engages the end of the wall 24.

From what has been said thus far, it should be appreciated that the bellows forms a hermetic seal and yet permits longitudinal movement of the sleeve member 44 in response to rotational movement of the screw member 34. It should further be appreciated that in either the extended dotted line position or the retracted full line position, all the threads of either the screw end portion or the head portion are mated with opposing threads so that the assembly is able to at all times withstand large longitudinal forces applied along the shaft 54. Due to the differential thread arrangement and the limit stops provided in both directions, the screw member 34 is prevented from vibrating out of the assembly. Despite this positive stop provided in each direction, the assembly can be easily disassembled by pulling the vertical flange 60 on the bellows upwardly out of the circular slot 50 and by then unscrewing the sleeve from the end portion 38 of the screw member 34. The screw member 34 then of course can be turned in a counterclockwise direction to withdraw it from the receptacle 30.

In order to facilitate the assembling of assembly 14, a circular boss 62 is formed on the outer surface of the flange portion 20 around the entrance to receptacle 30 into which the screw member 34 is inserted. In addition, a pair of spanner wrench holes 64 are defined in the flange portion 20 for the purpose of facilitating the insertion and removal of the assembly 14 into the seat 12.

Figure 4:
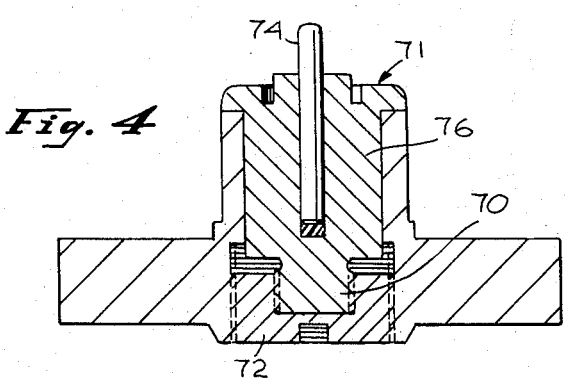
FIGURE 4 is a sectional view of an alternative embodiment of the invention.

Attention is now called to FIGURE 4 which illustrates an alternative embodiment of the invention. The embodiment of FIGURE 4 is identical to the already discussed embodiment of FIGURE 3 except however that in lieu of providing an externally threaded end portion on the screw member 34, an externally threaded end portion 70 is formed on the sleeve member 71. An internally threaded receptacle for receiving the end portion 70 is defined in the screw head portion 72. It should be appreciated that the operation of the embodiment of FIGURE 4 will be substantially identical to the operation described for the embodiment of FIGURE 3. The embodiment of FIGURE 4 has one noticeable advantage over the embodiment of FIGURE 3 and that is that a longer shaft member 74 can be used inasmuch as the total length of the sleeve 76 is greater. By inserting the shaft 74 to a greater depth in the sleeve member, it will have greater stability and be more resistant to any sidewise force.

From the foregoing, it should be appreciated that an assembly has been disclosed herein which provides a hermetic seal and permits the longitudinal movement of a member within a hermetically sealed container in response to the rotational movement of a screw head accessible on the outside of the container.

What is claimed is:

1. An assembly for converting rotational motion into longitudinal movement comprising:
   a screw member having oppositely threaded first and second portions of different diameter;
   a first member having a threaded portion threadedly engaged with said threaded screw member first portion;
   a second member having a threaded portion threadedly engaged with said threaded screw member second portion;
   means preventing relative rotation between said first and second members whereby rotation of said screw member will cause said first and second members to move in opposite longitudinal directions relative to said screw member;
   said means for preventing relative rotation between said first and second members including an expansible bellows member terminally secured between and hermetically sealed to said first and second members;
   first and second limit stops enclosed by said bellows member for respectively limiting the longitudinal movement of said screw member in first and second opposite directions.

2. An assembly for converting rotational motion into longitudinal movement comprising:
   a screw member having first and second portions of different diameter respectively externally threaded in opposite directions;
   a first member having an internally threaded receptacle mating with said screw member first portion;
   a second member having an internally threaded receptacle mating with said screw member second portion and a longitudinally extending wall defining an aperture therein;
   said first member supported in said wall aperture for longitudinal movement with respect thereto; and
   means preventing relative rotation between said first and second members whereby rotation of said screw member will cause said first and second members to move in opposite longitudinal directions relative to said screw member.

3. The assembly of claim 2 including first and second limit stops for limiting the longitudinal movement of said screw member in first and second opposite directions.

4. The assembly of claim 2 wherein a shoulder is defined in said second member between said receptacle and said aperture for limiting the longitudinal movement of said screw member in a first direction.

5. The assembly of claim 2 wherein said first member is provided with a terminal flange adapted to abut said wall to thereby limit longitudinal movement of said screw member in a second direction.

6. The assembly of claim 2 wherein said means for preventing relative rotation between said first and second members includes an expansible bellows member terminally secured between and hermetically sealed to said first and second members.

7. The assembly of claim 2 wherein said first member defines a longitudinally extending hole therein; and
means anchoring a shaft in said hole.

8. An assembly for converting rotational motion into longitudinal movement comprising:
- a screw member having first and second portions of different diameter respectively defining oppositely directed external and internal threads;
- a first member having an internally threaded receptacle mating with said screw member first portion;
- a second member having an externally threaded portion mating with said screw member second portion; and
- means preventing relative rotation between said first and second members whereby rotation of said screw member will cause said first and second members to move in opposite longitudinal directions relative to said screw member;
- said first member including a longitudinally extending wall defining an aperture therein;
- said second member being supported in said wall aperture for longitudinal movement with respect thereto.

References Cited

UNITED STATES PATENTS

| | | | |
|---|---|---|---|
| 82,161 | 9/1868 | Regester | 74—18.2 X |
| 1,527,154 | 2/1925 | Mallory et al. | 74—18.2 X |
| 2,511,338 | 6/1950 | Jennings | 74—10.85 X |
| 2,949,036 | 8/1960 | Ellis | 74—18.2 X |
| 3,210,852 | 10/1965 | Herndon | 74—89.15 X |

MILTON KAUFMAN, *Primary Examiner.*

FRED C. MATTERN, *Examiner.*

F. E. BAKER, *Assistant Examiner.*